F. GARAGNANI.
RAILWAY TRACK INDICATOR.
APPLICATION FILED JULY 14, 1921.

1,422,047.

Patented July 4, 1922.
2 SHEETS—SHEET 1.

Inventor
Frank Garagnani,
By
Attorney

F. GARAGNANI.
RAILWAY TRACK INDICATOR.
APPLICATION FILED JULY 14, 1921.
1,422,047.
Patented July 4, 1922.
2 SHEETS—SHEET 2.
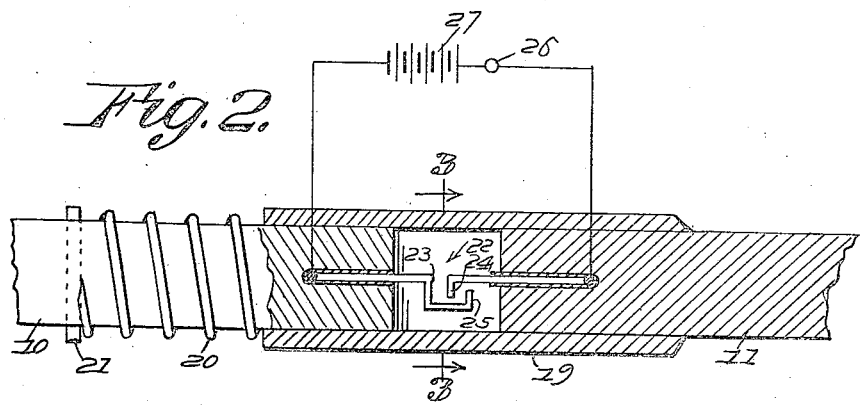
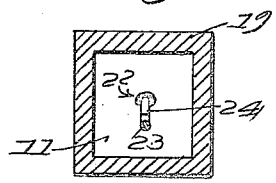
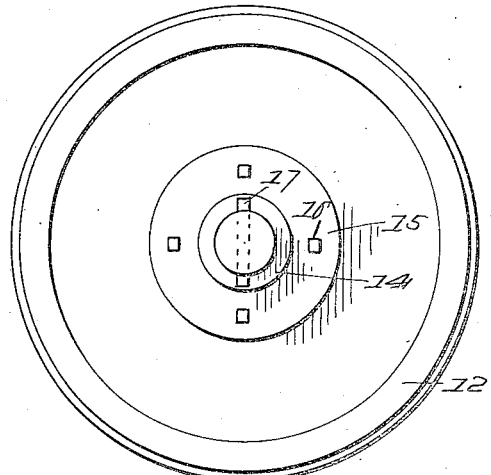
Inventor
Frank Garagnani,
By
Attorney

UNITED STATES PATENT OFFICE.

FRANK GARAGNANI, OF HERRIN, ILLINOIS.

RAILWAY-TRACK INDICATOR.

1,422,047.  Specification of Letters Patent.  Patented July 4, 1922.

Application filed July 14, 1921. Serial No. 484,661.

*To all whom it may concern:*

Be it known that FRANK GARAGNANI, a citizen of the United States of America, residing at Herrin, in the county of Williamson and State of Illinois, has invented new and useful Improvements in Railway-Track Indicators, of which the following is a specification.

The object of the invention is to provide simple and efficient means for indicating in the course of the progress of a train or car irregularities in the relative arrangement of or departure from a condition of true parallelism of the track rails, or in other words to indicate the locations of spread rails and contracted rails, in testing or inspecting the road to determine whether or not repairs should be made or whether the track has been properly laid or repaired, and more especially to provide a means for accurately indicating to an observer in a car or locomotive traversing a road whether or not the rails are uniformly laid or positioned within the limits of the requirements as to the interval between the same; and with this object in view the invention consists in a construction and combination of parts of which a preferred embodiment is shown in the accompanying drawing, wherein:

Figure 2 is a sectional view taken longitudinally of the axle of the apparatus.

Figure 3 is a transverse sectional view of the same.

Figure 5 is a side elevational view looking at one of the axially movable wheels from the outside.

Figures 1, 4:
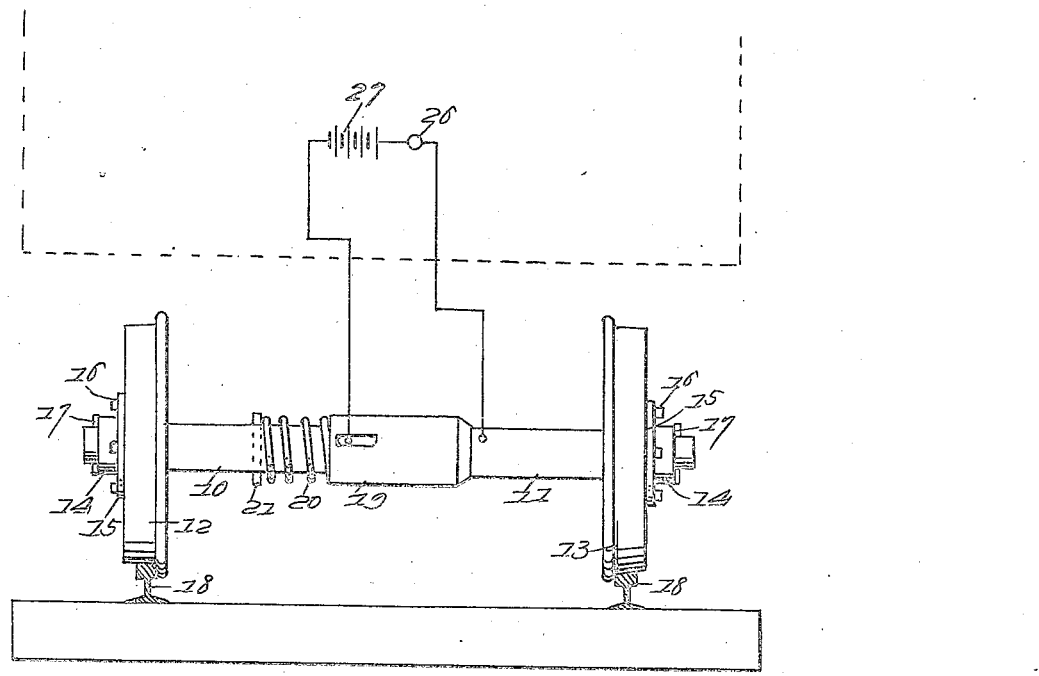
Figure 1 is an elevation of an apparatus embodying the invention shown applied to a car, which is indicated in outline in dotted lines disposed upon a railway track, said car and track being indicated in transverse section.
Figure 4 is a detail view of the circuit closer.

The apparatus consists essentially of a sectional axle having the members 10 and 11 which are disposed in axial alignment and are axially movable with the wheels 12 and 13 respectively carried thereby and to which, as shown in the drawing, they may be attached by means of collars 14 having flanges 15 bolted or riveted as at 16 to the wheels, the outer terminals of the axle members being fitted in said collars and engaged by transverse keys 17, in connection with means for indicating excessive movement toward and from each other of the inner or adjacent terminals of the axle members due to the movement of the wheels in following the track rails 18.

In the construction illustrated the adjacent terminals of the axle members are embraced by a telescoping sleeve 19 carried by one of the members, as for example the member 11, and the axle members are held yieldingly in their normal relations, with the wheels at a spacing corresponding with the prescribed gauge of the track rails by a coiled spring 20 fitted upon the axle member 10 and having terminal bearing at one end against the sleeve 19 and at the other end against a transverse key 21.

The means for indicating a deviation of the rails from a prescribed gauge, beyond a certain definite limit which may be allowed in practice as falling within the range of safety, consists of a circuit closer 22 having the relatively movable contacts 23 and 24 respectively carried by or movable with the axle members, and which for convenience may be termed inside contacts, and a further contact 25 having connection with one of said inside contacts and adapted for engagement with the other of said inside contacts by relative movement thereof, said contact 25 being for convenience referred to as an outside contact.

The relation between the contacts of which the relative positions are controlled by the relative positions of the axle members and hence by the relative positions of the wheels which traverse the track rails, is such that the contraction or reduction of the gauge of the track rails beyond the limit prescribed and for which the apparatus is set will cause the closing of the inside contacts while the divergence of the rails outwardly or the spreading thereof beyond the prescribed gauge of limitation of divergence from the prescribed gauge will cause the closing of the outside contacts, and as a means of visually denoting such variations of the rails either inward or outward there is employed a signal unit 26 such as an incandescent electric lamp in circuit with a battery 27 or other source of energy and said contacts to the end that the circuit will be closed by the engagement of the contacts of either set. Obviously a signal indicating the signalling means may be employed to denote the divergence in either direction, as indicated in the drawing, or separate signals may be employed in this connection and whereas a visual signal is illustrated, it will be understood that the invention contemplates any form of signal which can readily be noted by an observer as a means of determining the accuracy of arrangement of the rails of the track traversed.

Having described the invention, what is claimed as new and useful is:—

1. An apparatus for the purpose described having relatively movable axle members carrying rail traversing wheels and a signalling device having inside and outside contacts of which the elements are movable respectively by said axle members and are included in circuit with a signalling unit and a source of electrical energy, said contacts being housed in a sleeve arranged in telescoping relation with the axle members.

2. An apparatus for the purpose described having relatively movable axle members carrying rail traversing wheels and a signalling device having inside and outside contacts of which the elements are movable respectively by said axle members and are included in circuit with a signalling unit and a source of electrical energy, said contacts being housed in a sleeve carried by the inner terminal of one of the axle members and arranged in telescoping relation with the adjacent terminal of the other axle member.

3. An apparatus for the purpose described having relatively movable axle members carrying rail traversing wheels, and a signalling device having inside and outside contacts of which one is carried by one of the elements of the axle member and one by the other, the inside contacts consisting of a duality of cooperating elements engageable when the wheels move toward each other and the one inside and outside contact cooperating upon movement of the wheels away from each other, said contacts being housed in the sleeve carried by the inner terminal of one of the axle members and arranged in telescopic relation with the adjacent terminal of the other axle member, and a source of electrical energy with which the contacts are included.

In testimony whereof he affixes his signature.

FRANK GARAGNANI.